United States Patent [19]

Tanaka

[11] Patent Number: 5,745,974
[45] Date of Patent: May 5, 1998

[54] METHOD OF FABRICATING A CHAIN LINK ASSEMBLY HAVING BUSHES EACH PROVIDED INTEGRALLY WITH A RESIN SLEEVE ON ITS INNER CIRCUMFERENCE

[75] Inventor: Koji Tanaka, Osaka, Japan

[73] Assignee: Tsubakimoto Chain Co., Osaka-fu, Japan

[21] Appl. No.: 612,777

[22] Filed: Mar. 8, 1996

[30] Foreign Application Priority Data

Mar. 10, 1995 [JP] Japan ................... 7-078389
Feb. 26, 1996 [JP] Japan ................... 7-038165

[51] Int. Cl.$^6$ ................... B23D 11/00; B21L 9/00
[52] U.S. Cl. ................... 29/458; 29/525; 29/898.059; 59/8; 264/266; 264/269
[58] Field of Search ................... 29/458, 525, 527.1, 29/527.2, 898.055, 898.056, 898.057, 898.058, 898.059; 264/259, 266, 267, 269; 59/7, 8

[56] References Cited

U.S. PATENT DOCUMENTS 1,578,271  3/1926  Dull et al. .
3,049,933  8/1962  Besel et al. .
3,608,049  9/1971  Tavella ................... 264/266 X
4,774,749  10/1988  Furumura ................... 29/898.055
4,926,529  5/1990  Hosmer et al. ................... 29/898.055 X
5,667,442  9/1997  Tanaka ................... 59/8 X

FOREIGN PATENT DOCUMENTS 5-278064  10/1993  Japan .
926004    5/1963   United Kingdom ................... 29/898.055

*Primary Examiner*—S. Thomas Hughes
*Attorney, Agent, or Firm*—Armstrong, Westerman, Hattori, McLeland & Naughton

[57] ABSTRACT

The present invention improves the durability of a plastic sleeve formed integrally with a bush on the inner circumference of the bush. A method of fabricating a chain link assembly deforms a bush (1) set in a mold (2) into the same barrel-like shape as that of the bush (1) in the chain link assembly, injects a molten plastic into the mold to form a plastic sleeve (8) on the inner surface of the bush (1), and unites the bushes (1) respectively provided with the plastic sleeves (8) with chain link plates so that the internal stress induced in the sleeves (8) is removed.

3 Claims, 4 Drawing Sheets

METHOD OF FABRICATING A CHAIN LINK ASSEMBLY HAVING BUSHES EACH PROVIDED INTEGRALLY WITH A RESIN SLEEVE ON ITS INNER CIRCUMFERENCE

BACKGROUND OF THE INVENTION

The present invention is applied to an abrasion-resistant chain.

Most conventional, precision, abrasion-resistant chains have link assemblies having bushes each integrally provided with a sleeve of an engineering plastic on its inner circumference. A method of molding such a plastic sleeve is described in, for example, a method of fabricating a chain link assembly, disclosed in JP-A No. 5-278064.

This method sets a chain link assembly having bushes in a mold and injects a plastic in the mold to form plastic sleeves on the inner circumferences of the bushes.

When injecting the plastic into the mold by the above known method, the barrel-shaped outer circumference of the bush is caused to bulge further by an injection pressure and a mold closing pressure. Consequently, the bush contracts elastically and restores its original shape by its own elasticity when the same is removed from the mold and the injection pressure and the mold closing force are removed therefrom, whereby a compressive stress is induced in the plastic sleeve formed on the inner circumference of the bush, which is one of the causes of creep rupture.

SUMMARY OF THE INVENTION

The present invention bulges the outer circumference of a bush by an injection pressure and a mold closing force when injecting a plastic into a mold, and bulges the outer circumference of the bush in the shape of a barrel by a pressure when assembling a chain link assembly using press fit to solve the aforesaid problems in the prior art. The present invention further provides a method of fabricating a chain link assembly having bushes each provided integrally with a plastic sleeve on its inner circumference, the method involving: closing a mold having a core of a circular cross section for forming a mold cavity into which a plastic is injected to form a plastic sleeve on the inner circumference of the cylindrical bush, and provided with a bush mounting hole having an inner circumference defining a space to allow the bulging deformation of the outer circumference of the bush in the shape of a barrel when assembling the chain link assembly, after fixedly setting the bush therein with the opposite ends thereof positioned; injecting a plastic into the mold cavity while applying an injection pressure to the bush in addition to mold closing force so that the outer circumference of the bush may bulge out in the shape of a barrel; and forcibly fitting the opposite ends of the bush removed from the mold, elastically recovered its original shape having the cylindrical outer circumference, and integrally provided with a bush formed by molding and elastically deformed in the shape of an hourglass in bush holes formed in chain link plates so that the bush is deformed in the shape of a barrel in which the bush is deformed within the mold.

Since the outer circumference of the bush in the chain link assembly is bulged in the shape of a barrel corresponding to the bulged shape of the outer circumference the bush in the mold when the mold is closed and the plastic is injected into the mold, the shape of the plastic sleeve formed integrally with the bush on the inner circumference of the bush is the same as that of the plastic sleeve when the plastic is injected into the mold, any internal stress remains in the plastic sleeve and hence the plastic sleeve is not subject to creep rupture attributable to the internal stress.

When the plastic is injected into the mold cavity formed between the inner circumference of the cylindrical bush and the outer circumference of a cylindrical core having a circular cross section to form a plastic sleeve on the inner circumference of the bush and the bush is forcibly fitted in bush holes formed in chain link plates, the inner circumference of the plastic sleeve assumes a cylindrical shape corresponding to that of the outer circumference of the cylindrical core. When the plastic is injected into the mold cavity formed between the inner circumference of the cylindrical bush and the outer circumference of an hourglass-shaped core having a circular cross section to form a plastic sleeve on the inner circumference of the bush and the bush is forcibly fitted in bush holes formed in chain link plates, the inner circumference of the plastic sleeve assumes an hourglass-shaped shape corresponding to that of the outer circumference of the hourglass-shaped core.

DESCRIPTION OF THE PREFERRED EMBODIMENTS

A method according to preferred embodiments of the present invention will now be described with reference to FIGS. 1 to 3.

Figure 1:
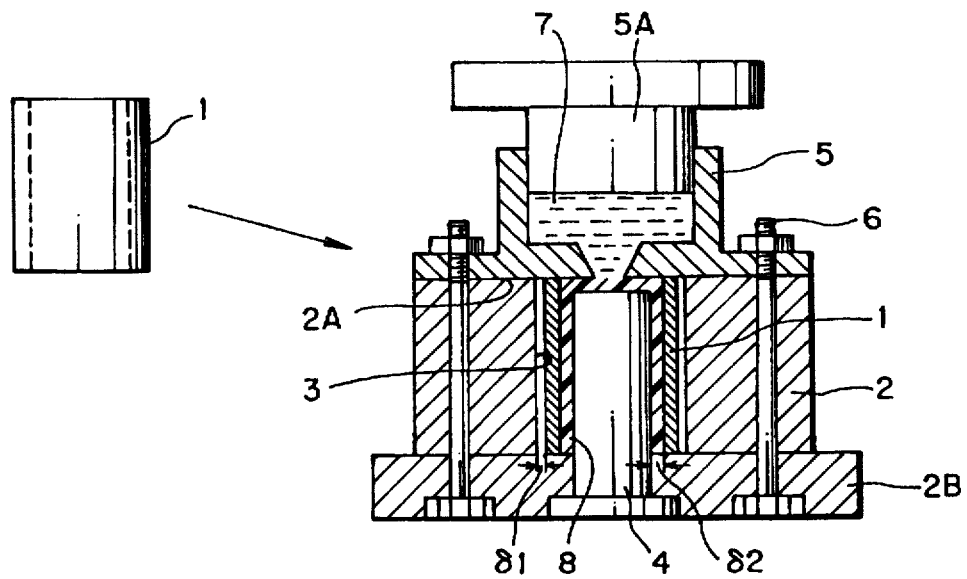
FIG. 1 is a sectional view of a mold and a bush set in the mold, for assistance in explaining steps of a method in a preferred embodiment according to the present invention.

As shown in FIG. 1, a cylindrical bush 1 is set in the cavity 3 of a mold 2. A space δ1 of a thickness in the range of 5 to 150 μm, preferably, 10 to 40 μm, is formed between the inner circumference of the cavity 3 and the outer circumference of the bush 1 to allow the outer circumference of the bush 1 to bulge in the shape of a barrel. And, a molding space δ2 is formed into which an engineering plastic is injected to form a sleeve 8 integrally with the bush 1. A pot 5 is fastened to the mold 2 with bolts 6. The upper end portion of the bush 1 projects slightly from the parting face (upper face in FIG. 1) of the mold 2 when the bush 1 is set in the mold 2, and the bush 1 is compressed and held firmly between the lower surface of the pot 5 in contact with the upper end of the bush 1 and the upper surface of the base 2B of the mold 2 in contact with the lower end of the bush 1 when the pot 5 is fastened to the mold 2.

The inner circumference of the cavity 3 may be formed in either a cylindrical shape as shown in FIG. 1 or in a barrel-like bulged shape, not shown, so as to define the space δ1. It is difficult to set the bush 1 in the mold 2 if the thickness of the space δ1 is less than 5 μm, and the inner circumference of the plastic sleeve 8 is unable to assume the shape of the outer circumference of a core 4 when tie thickness of the space δ1 is greater than 150 μm, which is undesirable.

Concentric circular grooves or the like are formed in the upper surface of the base 2B of the mold 2 to position the bush 1 in the cavity 3 coaxially with the cavity 3 and the core 4.

A hot molten plastic 7 is injected into the molding space δ2 by a known injection molding means to form a plastic sleeve 8 integrally with the bush 1 on the inner circumference of the bush 1. An injection pressure is maintained by a plunger 5A fitted in the pot 5. The bush is compressed by the injection pressure and a mold closing force, whereby the outer circumference of the bush 1 bulges in the space δ1. Since the bush 1 is firmly compressed between the mold 2 and the pot 5, the outer circumference of the bush 1 bulges into the shape of a barrel as shown in FIG. 2.

Figure 2:
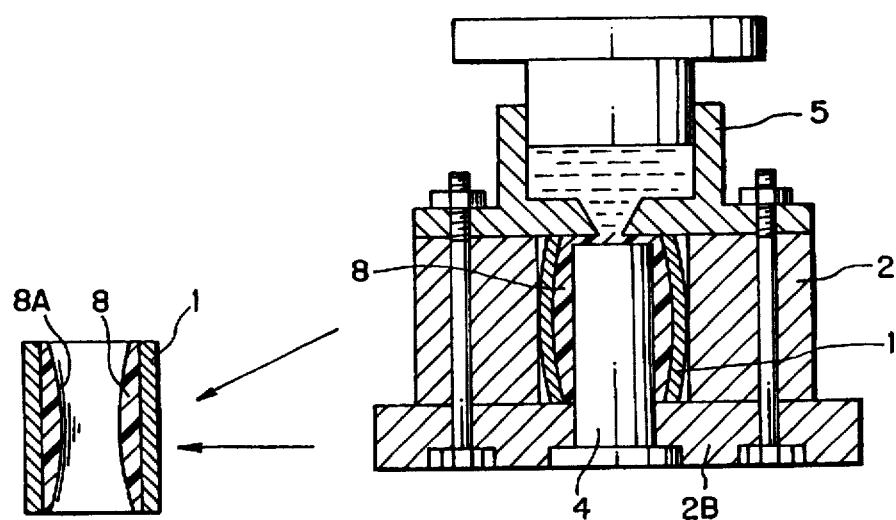
FIG. 2 is a sectional view of the mold in an injection molding process subsequent to the process shown in FIG. 1 and a sectional view of a bush removed from the mold.

Since the injection pressure exerted on the bush 1 by the plunger 5A and the mold closing force are removed from the bush 1 when the bush is removed from the mold 2 after cooling, the bush 1 recovers its original shape by its own elasticity and the outer circumference of the bush 1 recovers its original cylindrical shape (as shown in FIG. 2); consequently, the inner circumference 8A of the plastic sleeve 8 is deformed into the shape of an hourglass. Since the deformation of the sleeve 8 is maintained within the range of elastic deformation, the adhesion to the bush 1 of the sleeve 8 is not reduced.

Figure 3:
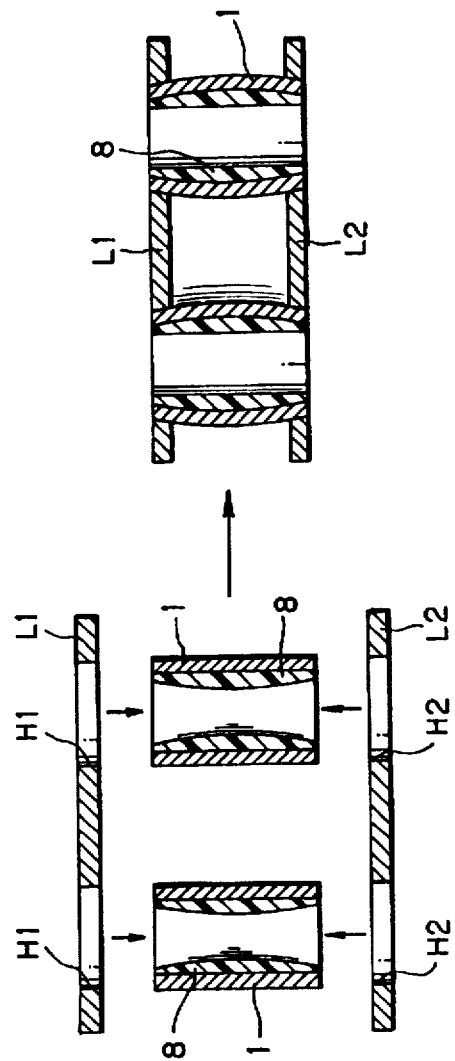
FIG. 3 is an exploded sectional view of a chain link assembly in a process subsequent to that shown in FIG. 2, for assistance in explaining a method of assembling the chain link assembly.

Then, as shown in FIG. 3, the opposite ends of the bushes 1 thus processed are forcibly fitted into the bush holes H1 and H2 of a pair of chain link plates L1 and L2 so that the bushes 1 are compressed between the chain link plates L1 and L2 to form a chain link assembly. The bushes 1 are deformed by the compressive force into a barrel-like shape similar to that in which the bushes 1 are deformed in the mold 2 during molding as shown in FIG. 2. Consequently, the plastic sleeves 8 recover the cylindrical shape, corresponding to the shape of the outer circumference of the cylindrical core 4, in which the sleeves are formed by molding, and the stress induced in the plastic sleeves 8 is removed.

Figure 4:
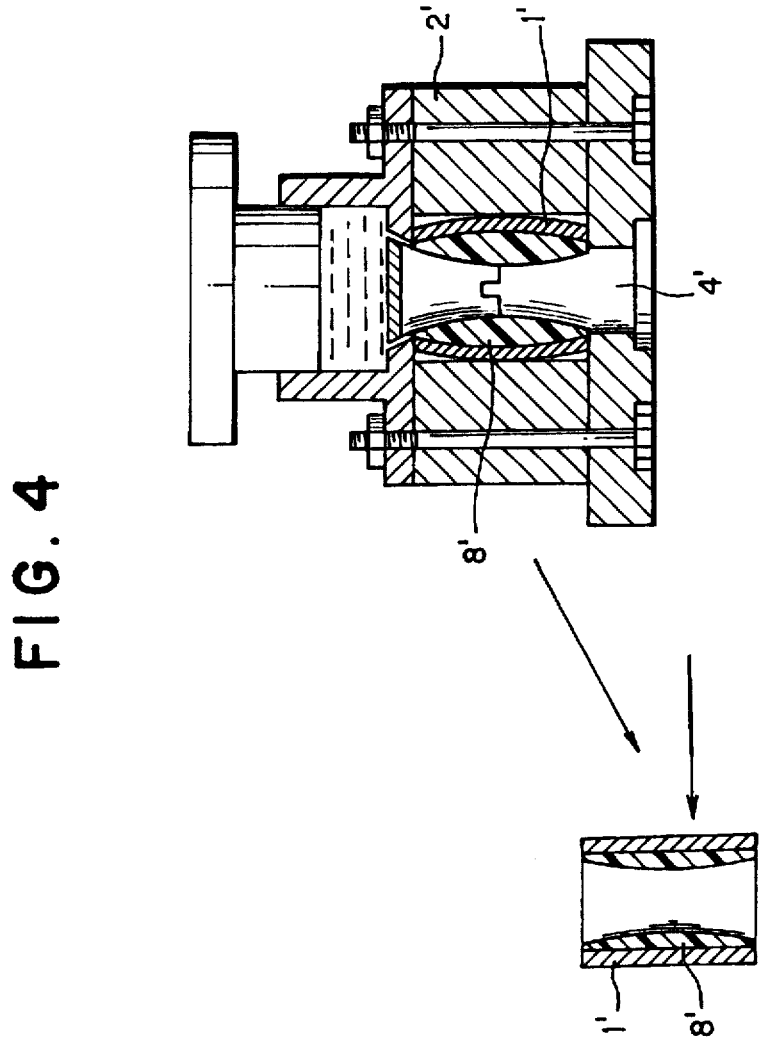
FIG. 4 is a sectional view of a mold in an injection molding process and a sectional view of bush removed from the mold, for assistance in explaining steps of a method in another embodiment according to the present invention.
Figure 5:
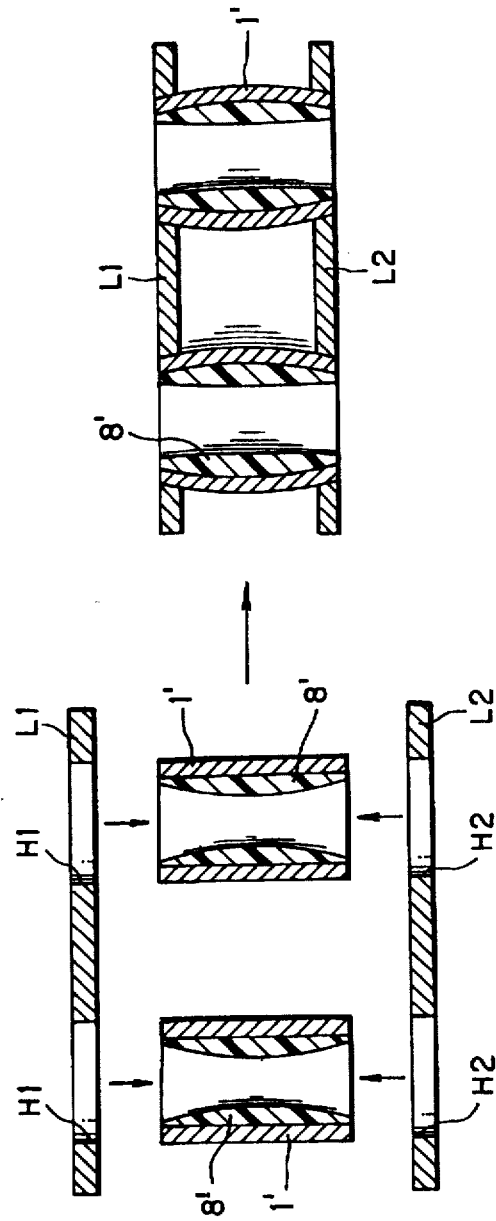
FIG. 5 is an exploded sectional view of a chain link assembly in a process subsequent to that shown in FIG. 4 and a sectional view of a chain link assembly, for assistance in explaining a method of assembling the chain link assembly.

FIGS. 4 and 5 are views for assistance in explaining a method according to another embodiment of the present invention. This method uses an hourglass-shaped core 4' instead of the cylindrical core 4 shown in FIG. 1. A molding space having an hourglass-shaped inner boundary in which a sleeve 8' of an engineering plastic is formed on the inner circumference of a bush 1' is formed between the outer circumference of the core 4' disposed in a mold 2', and the inner circumference of the bush 1'. The mold 2' is closed and a hot molten plastic is injected into the molding space by a known injection molding means. The bush 1' is compressed by an injection pressure and a mold closing force, so that the bush 1' is deformed in a barrel-like shape, the outer circumference of the bush 1' bulges, and the outer boundary of the molding space is deformed in the shape of a barrel. When the bush 1' is removed from the mold 2' after cooling, the bush 1 integrally provided with the plastic sleeve 8, recovers its original shape by its own elasticity and the outer circumference of the bush 1' recovers its original cylindrical shape, so that the plastic sleeve 8' is deformed and the hourglass-shaped inner circumference of the plastic sleeve 8' is caused to bulge radially inward.

Then, as shown in FIG. 5, the opposite ends of the bushes 1' thus processed are forcibly fitted into the bush holes H1 and H2 of a pair of chain link plates L1 and L2 so that the bushes 1 are compressed between the chain link plates L1 and L2 to form a chain link assembly. The bushes 1' are deformed by the compressive force into a barrel-like shape, similar to that in which the bushes 1 are deformed in the mold 2 during molding as shown in FIG. 4. Consequently, the plastic sleeves 8 recover the hourglass-like shape, corresponding to the shape of the outer circumference of the hourglass-shaped core 4', in which the sleeves are formed by molding, and the stress induced in the plastic sleeves 8' is removed.

Since the core 4' has an hourglass-like shape, the core 4' is a two-part split core which is split at its neck portion into an upper core part and a lower core part to facilitate the separation of the plastic sleeve 8' from the mold 2'. It is preferable to join the upper and the lower core part by a mortise-and-tenon joint to prevent the dislocation of the upper and the lower core part relative to each other when the hot molten plastic is injected into the mold 2'.

In the chain link assembly thus formed, the inner circumference of each plastic sleeve 8' bulges radially inward in the shape of an hourglass. Therefore, the plastic sleeve 8' having the hourglass-shaped inner circumference is suitable for reducing local pressures that tend to be exerted locally on the surfaces of the opposite ends of the plastic sleeves 8' when pins inserted in the plastic sleeves 87 are bent by a high tensile force acting on the chain.

According to the present invention, the bushes and plastic sleeves of the chain link assembly have the same shapes as those of the bushes and sleeves during injection molding, respectively, any internal stress does not remain in the plastic sleeves formed integrally with the bushes on the inner circumferences of the bushes when the bushes and the chain link plates are assembled. Thus, the sleeves are prevented from creep rupture attributable to all internal stress remaining in the plastic sleeves. Therefore, a chain consisting of the chain link assemblies fabricated by the method of the present invention has an enhanced abrasion resistance, the number of steps for fabricating the chain consisting of the chain link assemblies fabricated by the method of the present invention is equal to the number of steps for fabricating the conventional chain, and the chain can be fabricated at a high production efficiency.

Reference Characters
  1, 1' Bushes
  2, 2' Molds
  δ1 Space
  δ2 Molding space
  3 Cavity
  4 Cylindrical core
  4' Hourglass-shaped core
  8, 8' Plastic sleeves

What is claimed is:

1. A method of fabricating a chain link assembly having a plurality of bushes which are originally cylindrical in shapes wherein each bush of said plurality of bushes is integrally provided with a plastic sleeve on an inner circumference thereof, said method comprising:

providing a mold having a core of a circular cross-section for forming a mold cavity into which a plastic material is to be injected to form a plastic sleeve on said inner circumference of each bush of said plurality of bushes, said mold having an inner circumference defining a space for allowing a bulging deformation to occur at an intermediate portion of an outer circumference of each bush of said plurality of bushes so that each bush of said plurality of bushes forms a barrel-shaped configuration when assembling said chain link assembly;

fixedly setting each bush of said plurality of bushes in said mold with opposite ends of each bush of said plurality of bushes being positioned so as to prevent movement of said opposite ends of each bush of said plurality of bushes in an axial direction with respect to a longitudinal axis of each bush of said plurality of bushes when said mold is closed;

closing said mold:

injecting said plastic material into said mold cavity, while applying both an injection pressure and a mold closing force to each bush of said plurality of bushes so that said outer circumference of each bush of said plurality of bushes bulges out at said intermediate portion thereof so as to form said barrel-shaped configuration;

opening said mold;

removing each bush of said plurality of bushes from said mold; and forcibly fitting said opposite ends of each bush of said plurality of bushes which have been removed from said mold, which have elastically recovered so as to return to said original cylindrical shape with said outer circumference thereof being uniformly circular in cross-section, and which are integrally provided with said plastic sleeve formed by molding and elastically deformed so as to be hourglass-shaped, into bush holes formed in chain link plates of said chain link assembly so that each bush of said plurality of bushes is deformed into said barrel-shaped configuration when each bush of said plurality of bushes is deformed within said mold.

2. The method of fabricating a chain link assembly according to claim 1, wherein said step of injecting said plastic material includes injecting said plastic material into said mold cavity formed between said inner circumference of each bush of said plurality of bushes and an outer circumference of said core of said mold to form said plastic sleeve on said inner circumference of each bush of said plurality of bushes, and said step of forcibly fitting includes forcibly fitting said opposite ends of each bush of said plurality of bushes into said bush holes formed in said chain link plates of said chain link assembly so that said plastic sleeve has a cylindrical inner circumference.

3. The method of fabricating a chain link assembly according to claim 1, wherein said step of injecting said plastic material includes injecting said plastic material into said mold cavity formed between said inner circumference of each bush of said plurality of bushes and said outer circumference of said core, which has become hour-glass shaped, to form said sleeve on said inner circumference of each bush of said plurality of bushes, and said step of forcibly fitting includes forcibly fitting said opposite ends of each bush of said plurality of bushes into said bush holes formed in said chain link plates so that said sleeve has an hourglass-shaped inner circumference.

\* \* \* \* \*